United States Patent Office 3,557,434
Patented Jan. 26, 1971

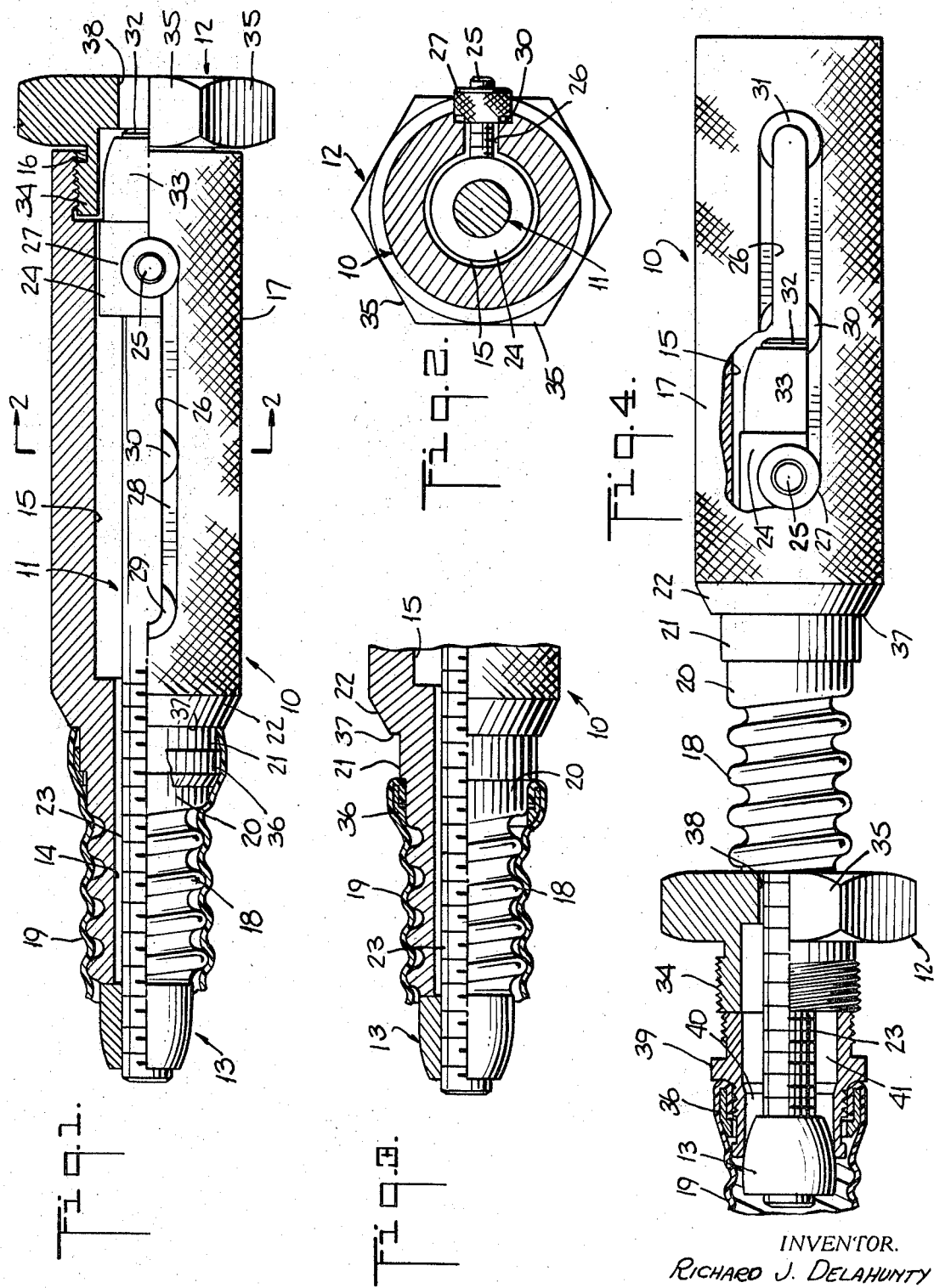

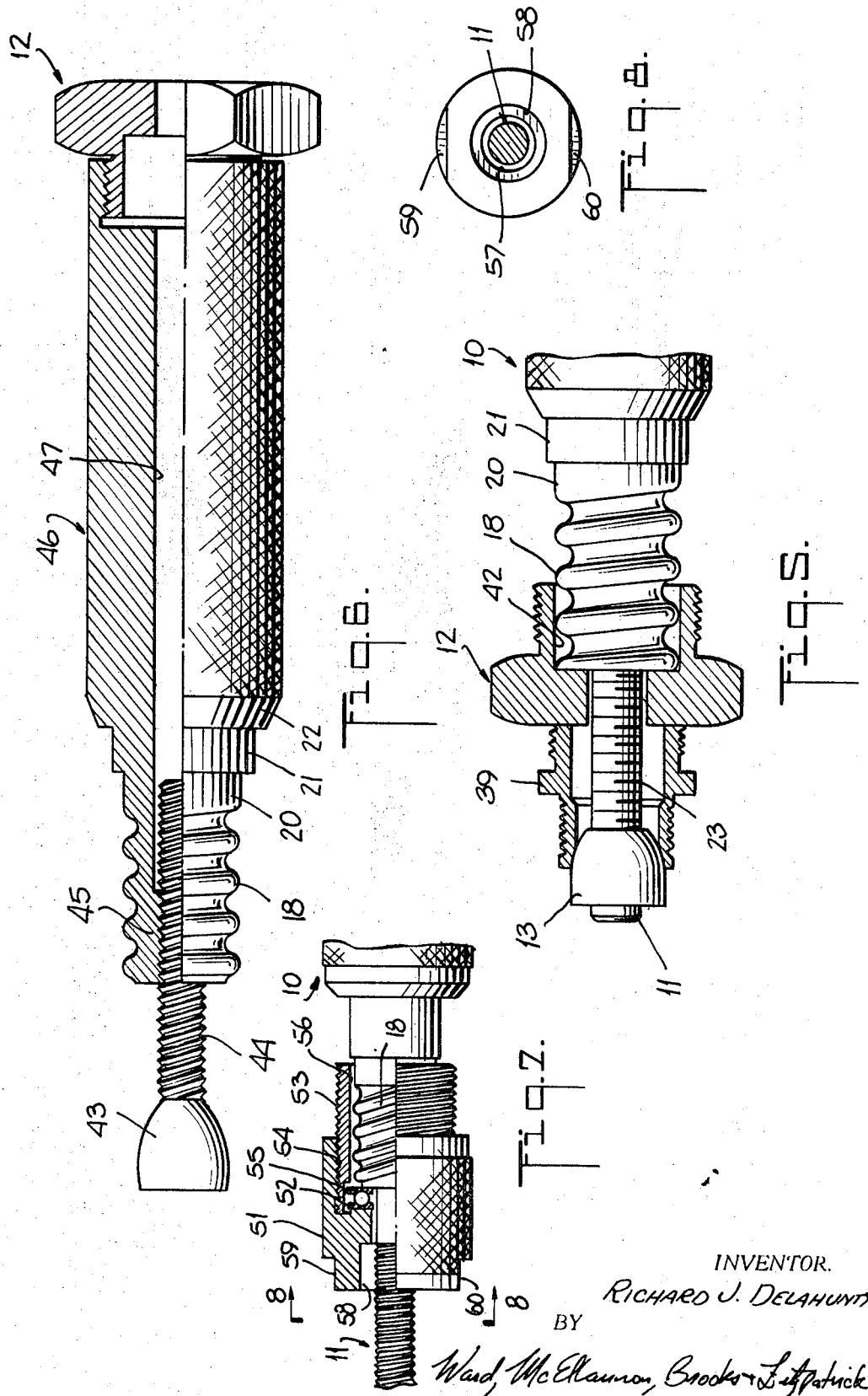

3,557,434
TOOL FOR ATTACHING AN END FITTING
Richard J. Delahunty, Chester, N.J., assignor to Co-Operative Industries, Inc., Chester, N.J., a corporation of New Jersey
Filed Sept. 26, 1968, Ser. No. 762,751
Int. Cl. B23p 19/00
U.S. Cl. 29—237
11 Claims

ABSTRACT OF THE DISCLOSURE

A combination tool with a handle having a helically threaded end for installing a metal sleeve within the end of a length of convoluted plastic conduit carries an extendible threaded stem. When the stem is extended and a combination bearing and anvil member is installed thereon, an expanding bullet can be caused to approach the combination member forcing its way through the bore of an intervening end fitting member for expanding the latter. In one embodiment the bullet is threaded on the stem, while in another, the bullet is integral with the stem which is threaded into the handle.

---

The present invention relates to a tool for use in attaching an end fitting to a conduit. More particularly, it relates to a tool for attaching a fitting to a convoluted plastic conduit.

In my copending application entitled "Electrical Plastic Conduit End Fitting and Assembly," Ser. No. 760,754 filed Sept. 19, 1968, there is described an end fitting for use with a thin walled convolution plastic conduit, the assembly being intended as a conduit for electrical wiring. As described therein, the particular fitting employs a metal sleeve which is inserted within the end of the plastic condiut whereupon the end of the conduit is cuffed over the end of the sleeve inwardly within a counterbore in the sleeve. The nose portion of a body member is then inserted through the sleeve with the conduit cuffed thereabout. An expanding tool is next employed to radially expand the nose portion of the body member in order to form an interlock with the sleeve and compress the end of the conduit between the nose portion and the sleeve. While those skilled in the art will be aware of various means for effecting assembly of the aforesaid end fitting, such assembly can be expedited with the use of a tool especially adapted thereto.

An object of the present invention, therefore, is to provide a convenient and inexpensive tool for efficiently aiding in the assembly of an end fitting as described in my aforesaid copending application.

In accordance with the invention, there is provided a tool for use in attaching such an end fitting to a conduit which comprises a hollow handle, an externally tapered expanding bullet, a stem carried within the hollow of the handle and projectable therefrom, the handle, stem and bullet being interconnected by means including interengaged threads for propelling the bullet toward and away from the handle upon relative rotation between the handle and the bullet in one direction or the other, respectively, and a combination bearing and anvil member with a central through bore mountable concentrically with a sliding fit on the projected stem in contact with the handle, the arrangement being such that rotation of the handle in a given direction relative to the combination member causes the bullet to approach the combination member forcing its way through the bore of an intervening end fitting member for expanding the latter when such a member has been previously interposed therebetween.

The invention will be better understood after reading the following detailed description of certain presently preferred embodiments thereof with reference to the appended drawings wherein:

FIG. 1 is a longitudinal view partly in section of one form of the tool showing its cooperation with the conduit at the moment of installing the sleeve therein;

FIG. 2 is a transverse sectional view along the line 2—2 in FIG. 1;

FIG. 3 is a fragmentary view of a portion of the structure of FIG. 1 showing the use of the tool in a subsequent step in the performance of the assembly operation;

FIG. 4 is a longitudinal view partly in section of the tool of FIG. 1 with an end fitting body member installed thereon to illustrate the operation of the tool during the expansion of the fitting member;

FIG. 5 is a fragmentary view similar to FIG. 4 showing an alternative mode of operation of the tool;

FIG. 6 is a longitudinal view partly in section showing a modified form of the tool;

FIG. 7 is a fragmentary view showing a still further modification of the tool; and FIG. 8 is a sectional view taken along line 8—8 in FIG. 7.

The same reference numerals are used throughout the figures of the drawings to designate the same or similar parts.

Referring now to FIGS. 1 to 4 of the drawings, the hollow handle is designated generally by the reference numeral 10, the projectable stem by the numeral 11, the combination bearing and anvil member by the numeral 12, and the expanding bullet by the numeral 13. The handle 10 is preferably tubular with the stem 11 disposed in a through longitudinal bore consisting of the section 14 at one end having a diameter making a slip fit with the stem 11, the intermediate section 15 of larger diameter, and the threaded counterbore section 16 at the opposite end. Externally, the handle has a gripping surface 17 which may be roughened by knurling or the like. The end of the handle containing the bore section 14 is provided with an externally threaded portion 18, the threads being arranged to match the convolutions of the plastic conduit designated by the numeral 19. Between the threaded portion 18 and the knurled portion 17 there is a transition zone consisting of cylindrical surface 20 having a first diameter, cylindrical surface 21 having a slightly larger diameter, and frusto-conical surface 22.

The stem 11 has a shank which is threaded over at least its prejectable forward portion 23 and an enlarged diameter section 24 at its inner end. The enlarged section 24 rides with a sliding fit within the bore section 15 of the handle. Projecting laterally from the section 24 of the stem is a threaded stud 25. The stud 25 projects through a longitudinal slot 26 in the handle to the exterior thereof. As best seen in FIG. 2, the projecting stud 25 provides means which interconnects the stem with the handle to prevent relative rotation therebetween. At the same time, the stud 25 carries a clamping nut 27 which is finger-manipulable. The margins of the slot 26 are provided with a flat surface 28 in a tangential plane for engagement by the flat bottom of the nut 27. In addition, at specified spaced intervals along the length of the slot 26 there are provided counterbored recesses, such as the recesses 29, 30 and 31, the latter being seen in FIG. 4. The recesses 29, 30 and 31 are arranged to receive and locate the nut 27. Each establishes a predetermined extension of the stem 11 from the handle 10.

As an optional feature, the end of the stem which is within the handle 10 is threaded at 32 and carries in threaded engagement therewith a spare expanding bullet 33 which may or may not have the same diameter as the bullet 13, as desired.

The combination member 12 is in the form of a cap with an externally threaded hollow boss 34. It may be provided with wrench flats 35 for enabling it to be gripped in a vise or the like. As seen in FIG. 1, the combination member or cap 12 may be installed in the threaded counterbore 16 of the handle. When the stem 11 is fully retracted as shown in FIG. 1, the spare bullet 33 is lodged within the hollow boss 34 of the cap 12 when the latter is installed in the counterbore 16.

Preferably, the handle 10 is fabricated from aluminum, the combination bearing element and anvil 12 is made of brass, while the expanding bullets 13 and 33 are fabricated from hardened steel. Steel is also employed in the fabrication of the stem 11 including the enlarged section 24 and the threaded stud 25. The knurled nut 27 may also be conveniently fabricated from steel.

In using the tool to assemble the aforementioned end fitting, the sleeve 36 is initially placed upon the forward end making a slip fit with the section 21 of the handle. The bottom of the counterbore in the sleeve engages the shoulder between cylindrical surfaces 20 and 21 on the tool. This is best seen in FIG. 1. At this stage, the stem 11 should be fully retracted. In addition, the bullet 13 is threaded on the exposed end of the stem and tightened in the position shown in FIG. 1 against the forward end of the handle.

With the sleeve 36 installed on the handle, the threaded end thereof is inserted in the end of the conduit and threadedly urged therein until the conduit rides over the sleeve and reaches the shoulder 37 on the handle between the surfaces 21 and 22. The tool is then withdrawn by unthreading from the conduit leaving the sleeve installed within the end of the conduit 19.

The next step is to turn the overhanging end of the conduit reentrantly into the counterbore of the sleeve. Then, as shown in FIG. 3, the tool is reinserted as far as it will go with the cylindrical surface 20 ironing out any folds of irregularities in the inwardly cuffed end of the conduit. The tool is then removed.

The nut 27 is now loosened and the stem extended. The extent to which it is extended will appear from the following discussion. The bullet 13 is removed from the end of the stem, the cap 12 is switched from the end of the handle to a position concentric with the projected stem in contact with the handle. The member 12 has a central bore 38 which makes a sliding fit with the end 23 of the stem 11. As shown in FIG. 4, the member 12 is installed with the hollow boss 34 projecting towards the exposed end of the stem 11.

The next step is to install the fitting body member 39 in abutting relation relative to the member 12. The bullet 13 is then replaced on the threaded end of the stem 11 with its tapered end entering the bore of the body member 39. The bullet 13 should be finger-tightened at this point.

The next step is to slip the previously prepared end of the conduit 19 with the sleeve 36 over the nose portion of the fitting body member 39 as shown in FIG. 4. As explained in my aforemenioned copending application, the various parts of the fitting will assume the relative relation shown in FIG. 4.

The bearing and anvil member 12 should now be secured against rotation, e.g., by placing it in a vise or the like. Rotation of the handle 10 will cause the bullet 13 to advance along the threaded portion 23 of the stem 11 and be drawn through the reduced diameter portion 40 of the member 39 to expand the same.

The body member 39 chosen for illustrating the operation of the tool is of the male type having a longitudinal region 41 adequate to receive the bullet 13 when it is drawn through the constricted portion 40. However, female type fittings are aforeshortened at this end. Hence, the provision of the hollow boss 34 in the member 12. The hollow cavity of the boss 34 provides, as seen in FIG. 4, a recess for receiving the bullet 13 as it is drawn through a shortened fitting member.

For the illustration in FIGURE 4 it was assumed by way of example that the fitting 39 had a length which when the member 12 was installed, as shown, required complete extension of the stem 11. In order to accommodate shorter fittings, the stem need be only partially extended. Of course the stem could be fully extended with all size fittings, but this would require for shorter fittings excessive manual manipulation of the bullet before it engages the end of the fitting. Therefore, for additional convenience, the counterbores, such as 29 and 30, are provided to locate the stem at the position best suited for the particular fitting.

To provide further flexibility with regard to the range of fittings accommodated by the tool, resort may be had to the feature disclosed with reference to FIG. 5 to which attention is now directed. As seen therein, the bore 42 within the boss of the member 12 is made large enough to override with a slip fit the threaded portion 18 of the handle 10. This enables the member 12 to be reversible. It should be apparent from a consideration of FIG. 5 that reversing the member 12 will require less extension of the stem 11 for a given length fitting 39.

Under certain circumstances, particularly when the tool is dimensioned for handling small diameter fittings, the threaded interengagement between the bullet and stem may represent a point of weakness. To enable use of a stem having a slightly larger diameter, resort may be had to the modification shown in FIG. 6. The bullet 43 is now formed integral with the end of the stem 44 which is threaded throughout its length. The threads on the stem 44 engage the internally threaded portion 45 of the handle 46. For manufacturing reasons a bore 47 may extend throughout the remainder of the length of the handle. The external configuration of the handle may be similar to that shown in the embodiment of FIG. 1. However, there is no longer need for the longitudinal slot 26. As shown in FIG. 6, the stem 44 is partially extended.

The operation of the tool shown in FIG. 6 will be substantially the same as the tool shown in FIG. 1. Instead of merely removing the bullet in order to assemble the member 12 and the end fitting, it will be necessary to remove the entire assembly of bullet 43 and stem 44. With an end fitting and the member 12 installed on the stem 44, the bullet 43 will be drawn through the fitting by rotating the handle 46 relative to the member 12. It should also be understood that the illustration in FIG. 6 is enlarged and exaggerated for clarity.

If it is found that excessive force is required to rotate the handle relative to the combination member when drawing the bullet through a fitting, resort may be had to the modification shown in FIGS. 7 and 8. The handle 10 and stem 11 may be the same as in FIG. 1; however, the combination member is altered to include a thrust bearing. As seen in FIGS. 7 and 8, the combination member 50 consists of a cylindrical body section 51, a thrust bearing 52, and an externally threaded retaining sleeve 53. The sleeve 53 has an external configuration projecting from the body section 51 which threadedly interfits the internally threaded counterbore section 16 in the handle (see FIG. 1) when the member 50 is not in use. At the same time the sleeve 53 is arranged to thread into the internally threaded bore 54 in body section 51, the inner end of sleeve 53 having a counterbore 55 to accommodate the bearing 52, as shown. The inner bore 56 through sleeve 53 is chosen to make a sliding fit with the threaded portion 18 of the handle 10.

The body section 51 has a bore 57 which makes a sliding fit with stem 11 and a counterbore 58 for accommodating the bullet, similar to the embodiment of FIG. 4, when a female fitting is being expanded. Although the major portion of the exterior of the body section 51 is provided with knurling for gripping by hand, the forward end has parallel wrench flats 59 and 60, best seen in FIG. 8. It will be understood that the reversible feature of the combination member will generally be lost when this embodiment is utilized. However, the increased ease in operation due to substantial reduction in the torque requirement and reduction in wear between the parts will normally be preferred. Obviously, the combination member 50 can be employed advantageously also with the embodiment of the tool illustrated in FIG. 6.

Having described the presently preferred embodiments of the invention, it will be apparent to those skilled in the art that various changes in construction may be made therein without departing from the true spirit of the invention as defined in the appended claims.

What is claimed is:

1. A tool for use in attaching an end fitting to a conduit comprising a hollow handle, an externally tapered expanding bullet, a stem carried within the hollow of said handle and projectable therefrom, said handle, stem and bullet being interconnected by means including interengaged threads for propelling said bullet toward and away from said handle upon relative rotation between said handle and said bullet in one direction or the other, respectively, and a combination bearing and anvil member with a central through bore mountable concentrically with a sliding fit on the projected stem in contact with said handle, the arrangement being such that rotation of said handle in a given direction relative to said combination member causes said bullet to approach said combination member forcing its way through the bore of an intervening end fitting member for expanding the latter when such a member has been previously interposed therebetween.

2. A tool according to claim 1, wherein said handle has a tubular externally threaded portion concentrically disposed around said stem where the stem projects therefrom, said threaded portion being arranged when said combination member is removed for threaded entry into the end of a length of convoluted plastic conduit, and means adjacent said threaded portion for receiving a sleeve for installation within the end of said conduit.

3. A tool according to claim 2, wherein said combination member is in the form of a cap with an externally threaded hollow boss for threaded installation in a threaded bore in said handle when not installed on said stem.

4. A tool according to claim 3, wherein the diameter of the cavity in said hollow boss is large enough to make at least a sliding fit with the externally threaded portion of said handle, and a thrust bearing is disposed within said boss for engagement by the end of said externally threaded portion of the handle.

5. A tool for use in attaching an end fitting to a conduit comprising a hollow handle, a stem carried within the hollow of said handle and selectably projectable therefrom, at least the projectable end portion of said stem being threaded externally along its length, means interconnecting said stem with said handle to prevent relative rotation therebetween, a combination bearing and anvil member with a central through bore mountable concentrically with a sliding fit on the projected stem in contact with said handle, and an externally tapered expanding bullet with a threaded through bore for threaded mounting on the threaded end of said stem, the arrangement being such that rotation of said handle in a given direction relative to said combination member causes said bullet to approach said combination member forcing its way through the bore of an intervening end fitting member for expanding the latter when such a member has been previously interposed therebetween.

6. A tool according to claim 5, wherein means are provided for locking said stem at a plurality of predetermined projecting distances relative to said handle, said distances being related to the length of corresponding end fittings.

7. A tool according to claim 5, wherein said handle is tubular with said stem disposed in a through longitudinal bore for projection from one end thereof.

8. A tool according to claim 7, wherein the through bore at the opposite end of said handle is provided with a threaded counterbore section and said combination member is in the form of a cap with an externally threaded hollow boss for threaded installation in said threaded counterbore when said combination member is not installed on said stem.

9. A tool according to claim 8, wherein the end of said stem which is within said handle is threaded and carries in threaded engagement therewith a spare expanding bullet.

10. A tool according to claim 9, wherein said spare bullet is lodged within the hollow boss of said cap when the latter is installed in the counterbore and said stem is fully retracted within the handle.

11. A tool according to claim 5, wherein said handle has a tubular externally threaded portion concentrically disposed around said stem where the stem projects therefrom, said threaded portion being arranged when said combination member is removed for threaded entry into the end of a length of convoluted plastic conduit, and means adjacent said threaded portion for receiving a sleeve for installation within the end of said conduit.

References Cited

UNITED STATES PATENTS

| | | | |
|---|---|---|---|
| 1,753,005 | 4/1930 | Grady | 29—237 X |
| 1,795,487 | 3/1931 | Grady | 29—237 |
| 2,146,756 | 2/1939 | Miller | 29—237 X |
| 2,298,379 | 10/1942 | Hoffman | 29—237 X |
| 3,286,332 | 11/1966 | Wilson | 29—243.52 |

ROBERT C. RIORDAN, Primary Examiner

J. C. PETERS, Assistant Examiner